US006195877B1

(12) United States Patent
Poulokefalos

(10) Patent No.: US 6,195,877 B1
(45) Date of Patent: Mar. 6, 2001

(54) APPARATUS FOR AND METHOD OF ATTACHING ITEMS TO A HANG STRIP

(76) Inventor: Dimitris Poulokefalos, 4834 N. Normandy Ave., Chicago, IL (US) 60656

( * ) Notice: Subject to any disclaimer, the term of this patent is extended or adjusted under 35 U.S.C. 154(b) by 0 days.

(21) Appl. No.: 09/300,551

(22) Filed: Apr. 27, 1999

(51) Int. Cl.[7] .............................. B23P 19/00; B23P 21/00; B23Q 7/00; B65H 23/34

(52) U.S. Cl. ................................ 29/819; 29/782; 29/714; 29/715; 29/818; 226/88; 226/89

(58) Field of Search .............................. 29/819, 782, 822, 29/818, 715, 714; 226/88, 89, 196.1

(56) References Cited

U.S. PATENT DOCUMENTS 5,647,118 * 7/1997 Laperriere et al. .................... 29/715
6,032,843 * 3/2000 Juergens, III .......................... 226/88

* cited by examiner

*Primary Examiner*—S. Thomas Hughes
*Assistant Examiner*—Marc Jimenez
(74) *Attorney, Agent, or Firm*—Vangelis Economou; Ladas & Parry

(57) ABSTRACT

An apparatus having a base for automatically opening interdigitated tab fingers formed on a hang strip. The base includes an item advancement station and an item attachment station is disposed at an edge of the base. A supply of hang strip material is provided at a base edge opposite the item attachment station. The hang strip supply is mounted to the base and is fed through the advancement station and across and through a tab retainer that maintains at least one of the interdigitated tab fingers open until the tab station is guided to the item attachment edge of the base. At the item attachment edge, perpendicular transversal of a corner or edge of the base causes one set of the interdigitated fingers to open, while at least one interdigitated tab finger opened at the item advancement station clears the back edge of the retainer. The item to be hung is placed onto the upwardly extended one(s) of the finger tabs at the base edge, and the other tab finger, upon clearing the tab retainer, is caused to be closed upon the item as the hang strip continues advancement through the attachment end of the base.

15 Claims, 4 Drawing Sheets

APPARATUS FOR AND METHOD OF ATTACHING ITEMS TO A HANG STRIP

BACKGROUND OF THE INVENTION

1. Field of the Invention

The present invention relates to an apparatus for releasably attaching items to a web, and deals more particularly with a device for attaching items arranged along a strip having formed interdigitated tabs to which the strips with the items is readily hung for sale to consumers in a store or point of sale location.

2. Background Art

The use of hang strips for point of sale merchandising is well known. Merchandisers have recognized the value of hang strip systems and manufacturers have responded by developing the use, loading and hanging of hang strips for point-of-purchase merchandising. Many versatile and useful configurations have been developed providing for ease of mounting the hang strips onto a merchandising mount located at the point of sale. The hang strips provide an attachment mechanisms for attaching items to be displayed on the hang strips. The hang strips include attachment fingers which hold the items, the items being releasable, held on the hang strip. When desired, the items can be detached by the purchaser at the time of purchase.

For examples of hang strip disclosures, see U.S. Pat. Nos. 2,656,917; 5,553,721; 5,103,970 and others, such as those available from assignee hereof, AGT, Inc., of Melrose Park, Ill. All of these patents relate to the configuration and interrelationship of elements on a hang strip, and essentially relate to hang strips cut to specified lengths, having of from about three to about twelve hang tabs to which the releasably attachable items are attached.

Hang strip materials can be commercially obtained in the form of a continuous roll, having evenly spaced apart cut portions for attaching or loading items for display. In these arrangements, the hang strip material is fed through a device for loading attachable items onto each of the tabs, and when a desired number of items are attached to a section of the continuous strip, the loaded strip section is then detached either by cutting or tearing along a transversely perforated boundary between adjacent sections.

Use of hang strips has become common so that associated devices used for loading the hang strip in an efficient and speedy procedure have become available. For example, a device available from Slip & Snip, Inc. of Sweet Home, Oreg. provides a sprocket wheel for advancing the hang strip, and provides for guides which hold the lateral edges of the hang strip adjacent the surface of a flat base. The sprockets of the sprocket wheel extend above the surface of the base so that each interdigitated tab of the cut portions is opened by a sprocket which protrudes through the cut portion. The sprocket engages the cut portion and, by rotation of the wheel, the sprocket advances the hang strip through the loading station, somewhat like a film in a photographic or movie camera.

At a maximum of the protrusion of the sprocket through the cut portion, the interdigitated tabs are opened and extend essentially transversely to the web surface of the hang strip. At that instant, the operator can load an attachable item onto the interdigitated tabs, and as the strip is further advanced so that the sprocket protrusion recedes below the surface of the base, the interdigitated tabs close over the attachment portion of the item to releasably retain it on the hang strip. The attachment is releasable, yet strong enough to hold the item in place when the loaded strip is shipped and hung for display at the point of sale location. A prospective purchaser of the item may easily remove the item from the hang strip for purchase, in accordance with known hang strip systems.

One difficulty that arises from use of the aforementioned loading device is that the sprocket mechanism is fully protruding through the tab at the time that the item is attached onto the open interdigitated fingers. This causes the sprocket to interfere to some extent with the item loading operation. Also, and especially if the item is bulky, attaching an item which extends over the previously loaded item on an adjacent cut portion causes the items to stack up. Bulky items cause space above the strip to be filled quickly, and will further interfere with loading. This results from the two dimensional surface of the base on which the items are attached to the hang strip. The items must be placed one atop the other during the attachment process, which leads to lack of space and other considerations.

Another loading mechanism which is also available is described in U.S. Pat. No. 5,647,118. The device described therein utilizes an elaborate system where indexing of hang strip movement of the tabs in discrete incremental sections to an item attachment station is controlled by an operator-activated actuator. The hang strip material is automatically advanced upon operator activation and the loading mechanism pauses to stop an unloaded cut portion of the strip adjacent an article attaching station. As described, a pin at the item attaching station is inserted into each hang strip cut portion from beneath the surface of the base to open at least some of the interdigitated tab fingers of each cut portion, thereby permitting loading of an item.

To overcome the stacking of bulky items on the surface of the base encountered in the aforementioned device, the item attachment station is disposed adjacent a base edge. As the interdigitated tab fingers are paused at the base edge, the pin is inserted to protrude through the cut portion to move certain ones of a set of tabs away from the web of the hang strip material. As the hang strip material is half folded over the base edge, it causes the opposite set of interdigitated fingers to also move away from the web of hang strip material for easier attachment of the items to the tab fingers.

This device, however, suffers from an unnecessary complexity and from an excessive number of moving parts occasioned by the elements described therein, such as the air pressure operator control mechanism, the indexing mechanism and the indexing procedure which counts the number of times the indexing has occurred so that a bang strip section may be cut by a cutting means, such as a knife. Excessive moving parts are known to be subject to failure, resulting in down time while the device is replaced.

What is considered necessary is an easy to operate, failure resistant, inexpensive device which has a minimum of moving parts and which does not include subsystems which require activation by or coaction of the operator to operate the apparatus.

SUMMARY OF THE INVENTION

Accordingly, what is considered to be the subject matter of this invention is an apparatus for releasably attaching items to a hang strip comprising a base, an item attaching station located on the base, hang strip material supply for continuously providing hang strip material to the item attaching station, and hang strip material advance drive to continuously move the hang strip material through the item attaching station. Preferably, the advance drive includes a sprocket wheel having sprockets for engaging formed cut portions in the hang strip material and for advancing the hang strip material through engagement of the sprockets with each of the formed cut portions. The advance drive and sprockets further maintain the cut portions open and a tab retainer retains open selected ones of the interdigitated tabs, which are opened by the advance drive until the item is attached to the other set of interdigitated tabs.

Preferably, the base includes a drive aperture formed therein and the advance drive is disposed partially below a base surface and partially extends through the aperture. The article attaching station is preferably located at a base edge and includes a guide for constraining and redirecting the path of the hang strip material downwardly about a right angle turn at the base edge. The guide redirects the hang strip material travel path from an essentially horizontal path to one that is downwardly and vertically directed. Means for cutting a hang strip transversely of its length is optionally provided and disposed on or adjacent the base. The optional cutting means may include a knife for automatically cutting the hang strip material into hang strips, each strip having a desired number of the formed cut shapes which have been attached at the item attachment station.

Preferably, the hang strip material supply includes a roll of the hang strip material mounted to a column attached to the base and extending vertically therefrom. The column includes a transversely extending spindle which may be threaded at one end thereof to be secured to the column utilized for mounting the supply roll.

One feature and distinct advantage of the present invention is an apparatus which is capable of receiving hang strip material in which is contained a plurality of similarly oriented hang tabs which are caused by operation of the apparatus to be opened so as to permit an item to be inserted within the opening of the otherwise closed tabs. Normal operation of the apparatus does not require activation of an advance mechanism by the item loader or apparatus operator.

The invention further may provide an optional device in the aforementioned apparatus wherein a given number of items can be successively attached to the hang strip material and thereafter the hang strip material is automatically cut to a specific item length with the given number of items remaining attached to the cut length of the hang strip material resulting in individual hang strips, ready for hanging at a point of sale.

The apparatus for releasably attaching items to a hang strip optionally also may include sensing means in the line of travel of the hang strip material for sensing the passage of a predetermined number of cut portions and for causing a cutting means to separate hang strips, each having the predetermined number of cut portions, from the hang strip material emanating from the supply thereof.

More specifically, described below is a hang strip loading apparatus for loading attachable items to a hang strip material, the hang strip material having a predetermined thickness, two lateral edges and a plurality of cut portions extending through the thickness of the hang strip material, each cut portion forming interdigitated tabs for releasable attachment of items thereto, each cut portion being spaced from the hang strip lateral edges and from any adjacent cut portions, wherein the device comprises a base having an upwardly facing surface, a hang strip material supply station for mounting a supply of hang strip material capable of continuously paying out hang strip material, an item attaching station, a hang strip material advance station for continuously advancing the hang strip material from the hang strip material supply station through the item attachment station, the advance station including at least one guide spaced from the base surface by at least the thickness of the hang strip material, the guide having an opening shaped and dimensioned to retain the two lateral edges of the hang strip material adjacent the base surface at the hang strip material advance station while exposing an opening directly above the cut portions thereof, the hang strip material advance station further including a cut portion tab lifting mechanism, comprising at least one protrusion member capable of protruding above the base surface, each protrusion member being shaped and dimensioned to protrude through one cut portion of the hang strip material so as to lift the interdigitated tabs above the surface of the base, the advance station further including an advance driver for translating the protrusion member and the hang strip material through the advance station from the supply toward the item attachment station, and a tab retainer adjacent the hang strip advance station, spaced from the base surface such that at least one of the interdigitated tabs of each cut portion lifted by the protrusion is retained by the tab retainer in a lifted position while the cut portion is rectilinearly translated from the advance station to the item attachment station, the tab retainer having a tab release portion at the item attaching station permitting the tab to close over the item after it has been releasably mounted to at least one of those interdigitated tabs not retained by the tab retainer.

DETAILED DESCRIPTION OF THE PREFERRED EMBODIMENT

Figure 1:
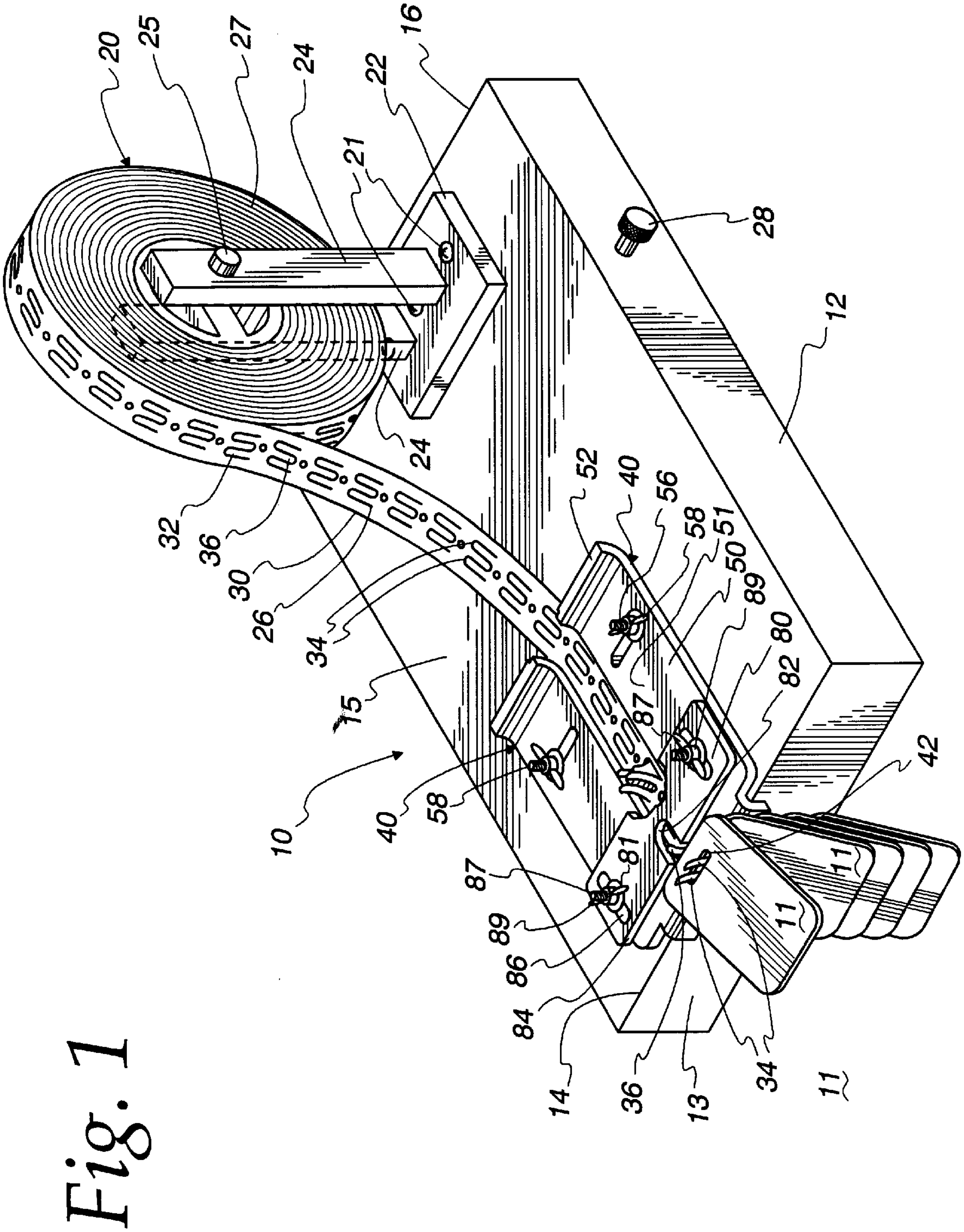
FIG. 1 is a perspective view of the apparatus of the invention shown with a supply roll of hang strip material located at one end thereof.

Referring now to FIG. 1, a perspective view of the apparatus is illustrated, generally indicated at 10, which comprises a base 12 having an upwardly oriented essentially horizontal surface 15 and at least one vertical wall 13 disposed at one peripheral end of the surface 15. Surface 15 meets vertical wall 13 at a base edge 14.

Disposed and mounted on surface 15 of the base 12 is a supply 20 of hang strip material, such as that illustrated in FIG. 1. The mounting mechanism for the hang strip material supply 20 may comprise a plurality of conventional bolts 21 or other conventional means, which preferably extend through a supply mount 22 and attach the supply mount base 22 onto surface 15 adjacent an oppositely disposed edge 16 of base 12, as shown. Although the hang strip material supply 20 is shown disposed above the surface 15 of base 12, it is contemplated that other arrangements are possible. For example, the hang strip material supply may be mounted below or laterally adjacent the base 12.

Preferably, when mounting above the surface 15, mount 22 is attached to a frame 24. Frame 24 includes an axle or spindle 25 which mounts a continuous roll 27 of hang strip material 26. The hang strip material 26 is conventionally a thin film of plastic or other flexible material having parallel sides approximately 1½ inches apart for hanging items 11 thereon. For a description of conventional hang strips, such as those which are contemplated as resulting from operation of the apparatus 10, reference is made to the aforementioned patents.

The hang strip material is paid out as the roll 27 rotates around the spindle 25. Although the hang strip material 26 is shown comprising a roll 27, other feed arrangements of the hang strip material supply are contemplated. For example, the hang strip material supply may comprise a container (not shown) in which sections of the hang strip material are laid end to end, the ends being attached to each other, and a continuous stream of hang strip material may be paid out of the container. Such an arrangement is used, for example, by stenographers and court reporters for paying out continuous paper strips on which court transcripts are stenographed. What is required is that the hang strip material be freely available to be paid out from the material supply 20 toward the other stations of the system, as described below.

Figure 2:
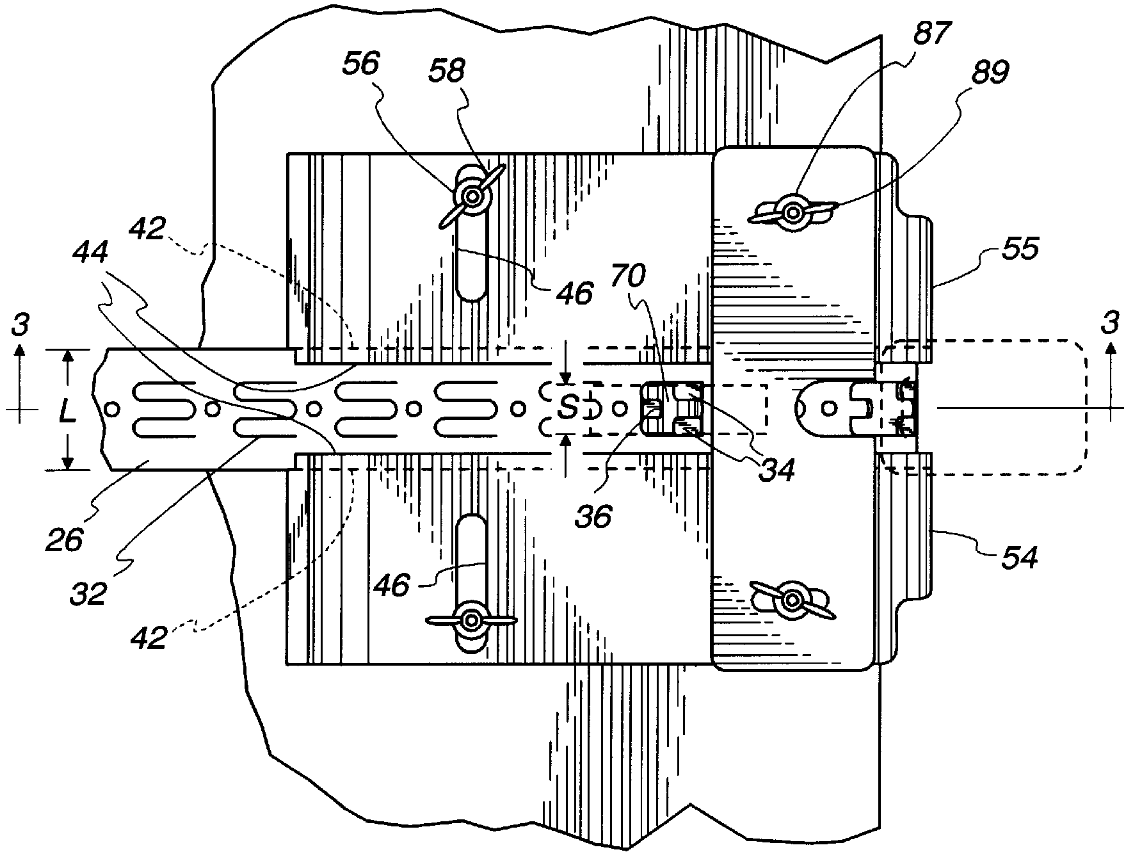
FIG. 2 is a partially fragmentary plan view of a first embodiment of an indexing station of the apparatus in which is used a single pawl mounting block.

In most instances, the hang strip material 26 comprises a flat continuous strip of polyethylene plastic having an essentially uniform thickness and an essentially uniform width L (FIG. 2). As the hang strip material is paid out from the supply 20, it comes off in a continuous strip which has top and bottom surfaces. The hang strip material normally further includes a plurality of cut portions 32 which are disposed between the parallel sides 30. The cut portions 32 are preferably cut in the shape of a "W," as shown, and as is taught by the aforementioned U.S. Pat. No. 5,553,721. The cut portions 32 extend through the plastic hang strip material 26 from the top surface to the bottom surface of the hang strip material 26. The two nearly vertical sides of the cutout 32, the lateral sides of the "W" shapes, may be angled relative to the longitudinal edges of the hang strip material 26, or, as shown, may be parallel to the edges. The width W of the cut-out portion 32 must be less than that of the width L of the hang strip material 26, and the cut-out should not extend to either edge of the hang strip material. Significantly, the width W of the cut-out should have a predetermined width, as is described below.

The cut-out 32 preferably provides a plurality of cut sections which can be bent away from the plane or web of the surface of hang strip material 26. Each of the cut portions 32 provides a plurality of interdigitated tabs 34, which extend in one direction parallel to the lateral sides of the hang strip material 26. Another set of tabs 36 extend in the opposite direction. The interdigitation of the tabs provides a web of interdigitated fingers having a capability of bending away from the surface and separating from the web of the hang strip material and from each other so as to project above that surface. The interdigitated tabs 34, 36 have a memory which attempts to bring the tabs 34, 36 back within the plane of the web of hang strip material 26. When an item 11 is placed within the tabs 34, 36, the tabs tend to close over the item 11, thereby releasably attaching the item 11 to the hang strip material web, in accordance with known methods as described in the aforementioned patents.

Although each cut portion 32 is shown as having only three interdigitated fingers, two extending in one direction 34 and the other one extending in the opposite direction 36, other configurations are possible. At least three fingers or tabs 34,36 are preferable.

A specific orientation of the fingers is preferred. That is, two of the fingers 34 should extend toward the direction of the hang strip material supply 20, and the other finger 36 extends away from the hang strip material supply 20 and toward the edge 14 of the base 12. However, a configuration of hang strip material can be used in which more than one set of fingers extends in either direction (not shown).

As the hang strip material 26 is paid out from the supply 20 and approaches the item attachment station 30 adjacent edge 14, it first encounters a guide 40, which may comprise one or more sections. As is shown in the cross-sectional view of the device illustrated in FIG. 3, and more clearly in the detail illustrations of the guide 40 shown in FIGS. 4A–4C, a groove or step 42 extends along the entire length of the lateral edge wall 44 of each portion of the guide 40. The step 42 has a dimension somewhat greater than the thickness of material 26, so that it may slide along the groove 42 without projecting outside of the groove.

The guide is shaped and dimensioned to accept the hang strip material 26 as it is paid out from the supply 20, and to guide the material longitudinally toward and adjacent the surface 15 of the base 12. The guide 40 preferably comprises an elongated flattened central portion 50 essentially parallel to the surface 15 of base 12, an upturned hang strip receiving portion 52 which extends obliquely upward from the central portion 50, and a perpendicularly, downwardly angled item attachment portion 54. Once the hang strip material meets the surface 15 at the central portion 50, the hang strip material 26 is maintained essentially parallel to surface 15 within groove 42.

In a preferred embodiment, guide 40 comprises two separate, distinct guide portions which coact to maintain the hang strip material 26 parallel to the surface 15 adjacent the item attachment station 30 disposed adjacent edge 14. However, the guide may also be a unitary element having a connection section, as is described with reference to the guide illustrated in FIG. 6, below. However, for purposes of the following discussion, guide 40 will be described as two portions, which are each attached to the surface 15 of base 12 in a manner to permit the hang strip material 26 to be transported transversely along the surface 15 of base 12 within a channel formed by the two opposed grooves 42 of each guide portion. For this reason, the groove or step 42 must have a vertical dimension somewhat larger than the expected thickness of the hang strip material so as to not interfere with the transportation of the hang strip material 26 through the channel.

Referring again to FIG. 2, the guide 40 comprises two opposite portions, which may be mirror images of each other. That is, when viewed in the longitudinal direction with the downwardly extending item attachment portion 54 closest to the viewer and the upturned hang strip receiving portion farthest away, each of the portions of guide 40 is disposed parallel to each other so as to permit a longitudinal passageway between the walls 44 of the guide 40, and the channel formed by the grooves 42. The width of the channel is slightly smaller than the lateral width L of the hang strip material 26, to permit slideability of the hang strip material through a slight clearance. The width of passageway between walls 44 is noticeably smaller than the width L of the hang strip material 26.

The groove or step 42 of the guide portions defines an overhanging or cantilevered projection which provides for a space between it and the base surface 15 to accommodate a thickness for the hang strip material 26. A lateral dimension between the inner walls of the grooves 42 is slightly greater than the lateral width of the hang strip material 26 to permit passage of the hang strip material 26 laterally along the opening between the two portions of guide 40.

Each portion of guide 40 further includes at least two longitudinal guide attachment apertures 46 which provide a means of attachment by upstanding threaded bolts 56 (FIGS. 1 and 2) extending upwardly through surface 15 and retained to the base to avoid from rotation, for example, by welding or by a bolt securement within the base 12. The bolts 56 extend through apertures 46 and are capable of receiving wing nuts 58 onto the threaded portion thereof. Tightening of wing nuts 58 over the bolts 56 secures the portions of guide 40 from transposition laterally of the direction of travel of the hang strip material 26, thereby maintaining the lateral distance between walls 44 essentially fixed during operation of the apparatus 10.

Attachment apertures 46 extend longitudinally from close to the wall of groove 42 toward the opposite wall of the portions of guide 40, so that some lateral adjustment of the guide 40 may be made to accommodate for different widths L of the hang strip. For example, if a wider width L of hang strip material 26 is mounted at the hang strip material supply 20, then the hang strip material is brought to the upturned hang strip receiving portion 52 of the guide 40, the wing nuts 58 are unscrewed, and the lateral width of the opening between walls 44 of the guide 40 are adjusted to accommodate the width of the wider or narrower hang strip material. After centering of the gap between the two portions of the guide 40, and a parallel disposition between walls 44, the wing nuts 58 are again re-tightened and the guide is ready for receiving and transposing the different width hang strip material received from the hang strip material supply 20.

Bolts 56 are disposed on the surface 15 of base 12 in a position relative to the attachment apertures 46 of the guide 40 to position the transition portion 55 disposed between the central portion 50 and the downwardly extending portion 54 to define the item attachment station 30 adjacent the edge 14 of base 12. The two portions of guide 40 are attached to bolts 56 after the lateral distance between walls 44 is established.

Preferably, the transition portion 55 and the downwardly extending item attachment portion 54 are cantilevered from the surface 15 of the base 12, but the attachment portion 54 and the rounded corner of the transition portion 55 are disposed a small distance beyond the vertical wall 13 and edge 14. The grooves 42 of each section of guide 40 continue to guide the edges of the hang strip material 26 between the item attachment portion 54 and downwardly extending base wall 13. The clearance between the groove 42 of the downwardly extending item attachment portion 54 and the vertical wall 13 of base 12 must be large enough to permit the passage therethrough of the hang strip material 26, but not so large as to bend the material 26 away from the item attachment station 14. This configuration is useful in the attachment sequence of the items 11, as will be explained below in the description of the operation of the device.

Placement of the bolts 56 and 87 on the surface 15 of the base 12 is an important consideration. Enough clearance must be provided between the uppermost surface 51 of the guide central section 50 and with regard to the other elements, described below, which will be disposed upon the surface 51. For this reason, it may be beneficial and desirable to drill and tap holes in the surface 15 of base 12, into which bolts (not shown) are engageable, thereby attaching the portions of guide 40 to the surface 15 of base 12. Vertical and horizontal clearance of the head of such bolts (not shown) on surface 51 will provide the necessary space to support other elements disposed over surface 51 of central portion 50. Of course, alternate attachment configurations will readily become apparent to the person having ordinary skill in the art which may provide for efficient operation. For example, the configuration shown and described in U.S. Pat. No. 5,647,118 may be utilized, with modifications. Such alternative attachment configurations are contemplated as being equivalents hereof, and to come within the scope of the present invention, but the attachment configuration is not considered a critical part of the present invention.

As the hang strip material 26 is guided through the hang strip receiving section 52 and between the surface 15 and grooves 42 of guide 40, it is directed downwardly toward, and in parallel with, surface 15 of base 12. As most clearly visible in FIGS. 2 and 3, the hang strip material is guided by the guide 40 to the surface 15 and is retained parallel thereto by the cantilevered portions of the guide 40 defined by grooves 42 and walls 44. As described above, the lateral dimension between walls 44 of the two portions of the guide 40 is smaller than the lateral width L of the hang strip material, so that the overhanging edges of grooves 42 and walls 44, which define the guide channel, inhibit the escape by upward movement of the edges of the hang strip material 26. This configuration exposes a central section of the hang strip material, which is in the passageway defined by the edges covered by the cantilevered portions of the guide 40.

The transposition of the hang strip material along and through the guide channel may be accomplished by any of a number of ways. One feature of the present invention is to accomplish the longitudinal translation or transposition through the guide channel by means of a sprocket wheel which further performs the function of raising the interdigitated tabs or fingers 34,36 above the surface of the web of the hang strip material 26. In this regard, the sprocket wheel works for the most part like the aforementioned apparatus which is available from Slip and Snip, Inc. of Sweet Home, Oreg.

Figure 3:
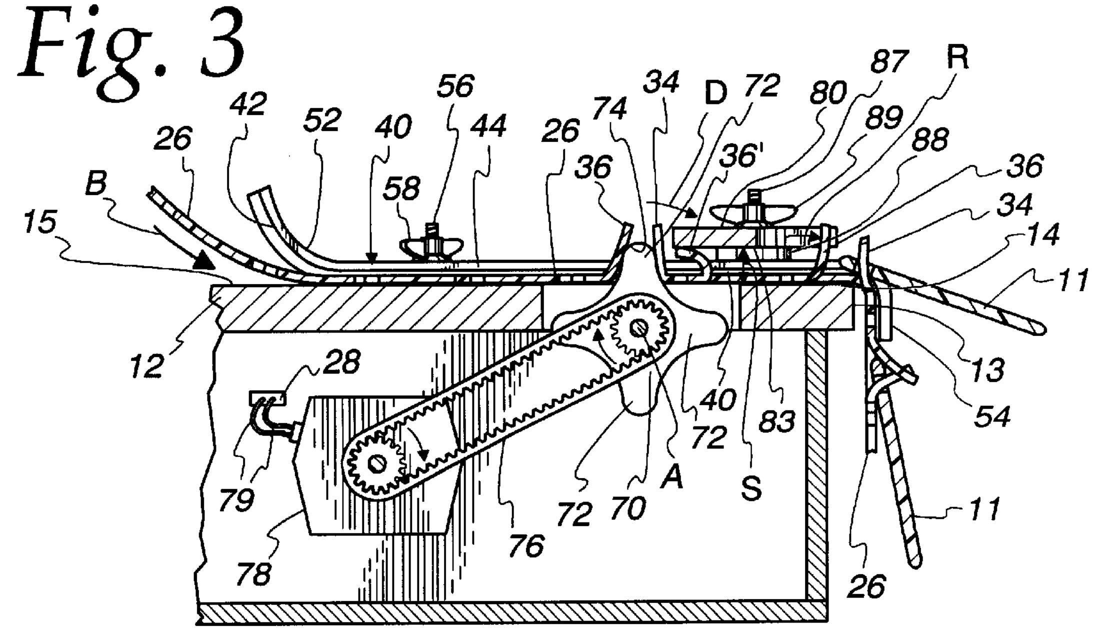
FIG. 3 is a vertical sectional view taken along line 3—3 in FIG. 2.
Figure 4A:
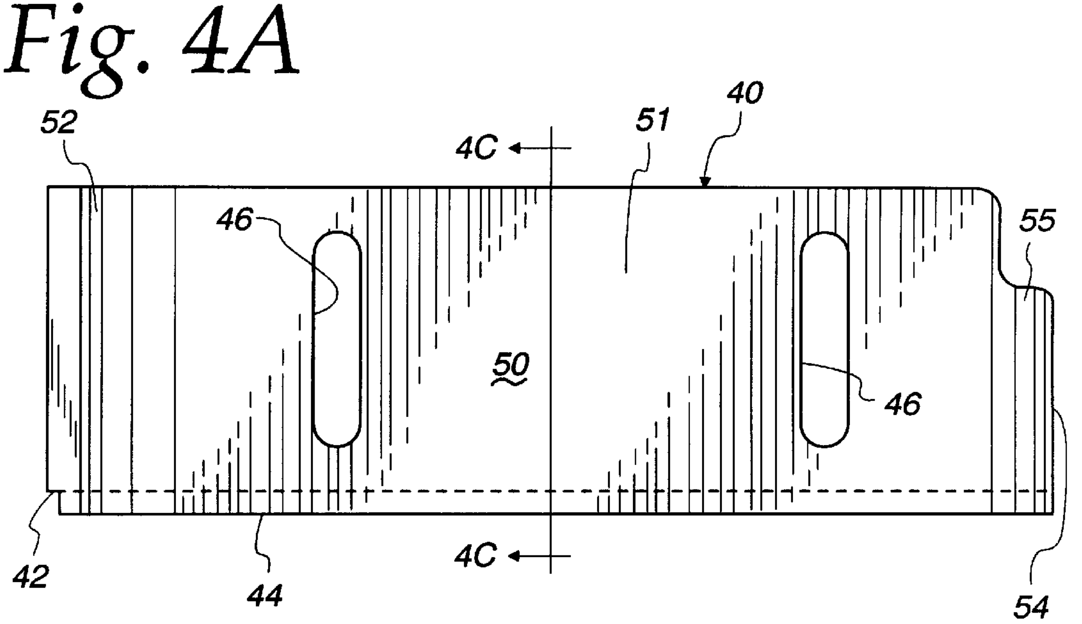
FIG. 4A illustrates a plan view of a guide according to one embodiment of the present invention.
Figure 4B:
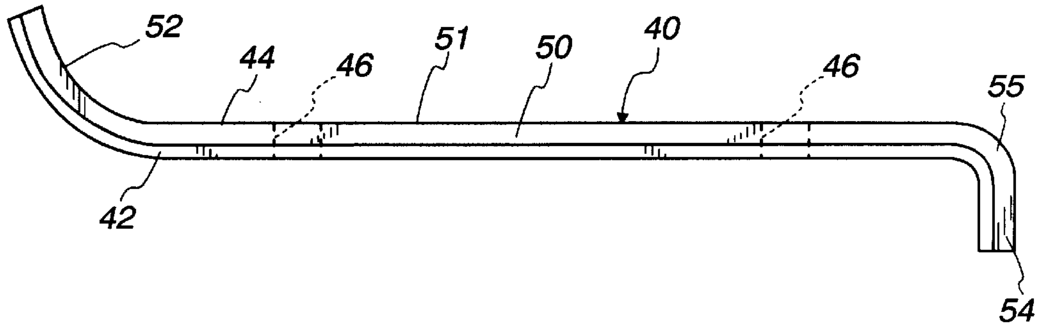
FIG. 4B is a side view of the guide shown in FIG. 3A.
Figure 4C:
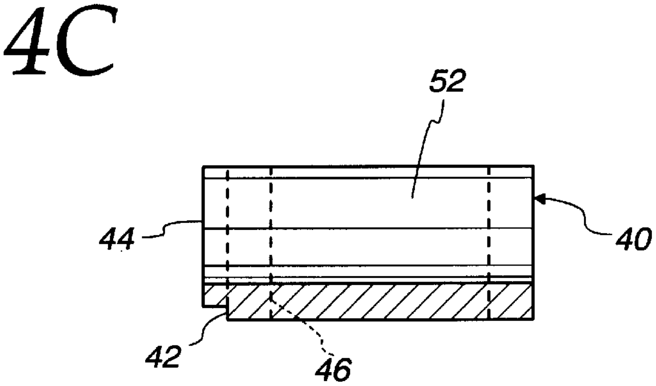

Referring now to FIGS. 2 and 3, sprocket wheel 70 is rotatable about an axle 71. Axle 71 is disposed below the surface 15 of base 12. The sprocket wheel 70 includes a plurality of sprockets 72, preferably having rounded comers 74. The width of the sprocket wheel 70 has a predetermined width S, which is slightly less than the width W between the two ends of the cut-out portion 32. Thus, one of the sprockets 72 of wheel 70 may protrude through the cut-out 32 to cause each of the interdigitated tabs 34, 36 to bend away from the web surface of the hang strip material 26, as shown in FIG. 3. In determining the optimal width of the sprockets 72, it is important to recognize that it must be able to fit within the dimension of the side walls forming each W-shaped cutout 32.

The protrusion of a sprocket 72 into a cutout 32 forces each of the interdigitated tabs 34,36 to disengage the associated others of the interdigitated tabs of the cutout 32. Since the interdigitated tabs 34,36 are each attached to the web of the hang strip material at their opposite ends, tabs 34 being attached at the "top" of the W-shaped cut-outs 32 and tabs 36 being attached at the "bottom," the tabs bend away from the web in opposite orientation. As configured in the embodiment shown in FIGS. 1–3, the tabs 34, when lifted from the web surface of the hang strip material 26, have free ends which are closer to the hang strip material supply 20 disposed at edge 16, and the attached ends of the tabs 34 are closer to edge 14. Conversely, for tabs 36, the attached ends are closer to the supply 20 and the free ends are closer to edge 14. Moreover, the protrusion of a sprocket 72, as shown in FIG. 3, will cause the bending of the tabs 34,36 in opposite directions as the hang strip material passes through the guide, and the lateral edges of the hang strip material are being held down by the cantilevered portions of guide 40, as explained above. Thus, the sprocket 72 cannot lift the entire web of hang strip material 26 away from the surface 15, but is only permitted to lift up the interdigitated tabs 34, 36 of the particular cut-out portion 32 which is passing above the sprocket wheel 70.

The aforementioned prior art device of Slip and Snip, Inc. attaches the items, e.g. item 11, to the hang strip material 26 at this point, leading to spatial considerations. As is described above, the attachment of items using the prior art device results in operational difficulties in space limitation and sprocket interference. This invention and the present inventive configuration is an improvement over the prior art devices.

The sprocket wheel 70 includes a belt 76 and gear mechanism, or other appropriate device, which connects the axle 1 of sprocket wheel 70 to a sprocket wheel motive device, for example, an electric motor 78. The motor 78 is itself connected by an electrical connection, such as lead wires 79, to an on-off/adjustable, variable speed switch 28, as described relative to FIG. 1 above.

Activation of the sprocket wheel motive device, such as by rotation of the spindle of the motor 78, causes the sprocket wheel 70 to rotate about the axle 71, causing rotation of the sprockets 72, and successive ones of the sprockets 72 to protrude through the surface 15. Each sprocket 72 thereby engages successive ones of the cutouts 32 of the hang strip material 26, which are disposed at predetermined positions matching the sprocket separation.

The sprocket wheel 70 provides a dual function. First, as described above, each sprocket 72 causes the separation of the interdigitated tabs 34,36 or fingers from each other and from the web of the hang strip material 26. The sprocket 72 protrudes through the aperture defined by cutout 32, and permits a loose interference fit within the aperture of cutout 32. As best seen in FIG. 3, as the interdigitated tab 34 is pushed up by the protrusion of sprocket 72, the rounded corner 74 of each sprocket 72 engages the cutout portions of the opposing interdigitated tabs 36, which has been caused to extend upwardly by the protruding sprocket 72. The sprocket engages the cutout 32 because the cantilevered portions of guide 40 retain the lateral edges of the hang strip material flush against the surface 15 of base 12, and protrusion of the sprocket 72 above the surface 15 causes it to protrude upwardly through the web of the hang strip material 26.

Rotation of sprocket wheel 70 around axis 71 causes temporary engagement of the rounded corner 74 of each sprocket 76 with a corresponding cutout 32 of the hang strip material 26. As the sprocket 72 is rotated by the wheel 70, it advances in a longitudinal direction along the guide channel.

Appropriate and conventional electrical means are utilized to cause the motor to always rotate in the same direction, that is, clockwise as shown in FIG. 3, thereby causing the hang strip material 26 to advance through the guide channel from the supply 20 (FIG. 1) toward edge 14. Advantageous spacing of the various elements of the system will ensure that each sprocket 72 engages a succeeding cutout 32. For example, judicious disposition of the axle 71 at a sufficient distance below the level of surface 15 permits a circumferential distance between the radially extending sprockets 72 to match the linear distance between adjacent cutouts 32 of hang strip material 26. Commercially available hang strip materials, and the resultant hang strips, normally provide for a predetermined distance between adjacent cutouts. The dimensional adjustment between the various elements, e.g., the location of sprocket axle 71 relative to the surface 15 of the base 12, need not be changed once these have been optimized into a final configuration of apparatus 10.

It should be appreciated also that the configuration of the hang strip loading apparatus 10, as described above, joins the tab projection mechanism of the sprocket wheel 70 with the advance mechanism provided by the same sprocket wheel 70. That is, the projection mechanism opens interdigitated tabs 34,36 and projects them upwardly from the place of the hang strip material web. Simultaneously, the advance mechanism engages the web of hang strip material 26 and advances it toward edge 14.

The configuration shown permits the advance speed of the hang strip material 26 from the supply station 20 to the opposite edge 14 of the base 12 to vary at a desired rate, while simultaneously projecting and engaging each successive sprocket 72 through adjacent cutouts 32 as the hangs strip material 26 advances through the consecutive stations of the apparatus 10. Of course, adjustable variability in the speed of the hang strip material advance through the apparatus 10 is a desirable characteristic. In the embodiment shown, the speed of advance is controlled by the adjustment knob 28 controlling the number of motor revolutions per minute. Another desirable characteristic of this configuration is that the adjustability of the speed cannot easily be regulated by the operator. Once the speed has been set prior to normal operation, the advance of the hang strip material 26 is continuous through the channel and is constant without reference to the ability of the operator to easily stop or slow down that hang strip material advance. It may be advantageous to provide a cover (not shown) which protects the adjustment knob 28 from easy access by the operator.

Referring again to FIGS. 1–3, mounted upon surface 51 of the guide 40 is tab retainer 80, which comprises an important inventive feature of the present invention. The tab retainer 80 performs the indispensable function of retaining one set of interdigitated fingers, either 34 or 36, in a bent back position while the hang strip material 26 is being advanced through the channel provided by the guide 40. For purposes of the description below, the bent-back set of tabs will be tabs 36 (FIG. 3). However, it is possible to orient the hang strip material 26 in the opposite direction so that tabs 34 are bent back, rather than tabs 36. Either set of bent back tabs or finger(s) is released as the cutout 32 reaches the edge 14, so as to close over an item, Such as item 11, which has been attached to the opposite set of tabs or fingers of each cutout 32.

Figure 5A:
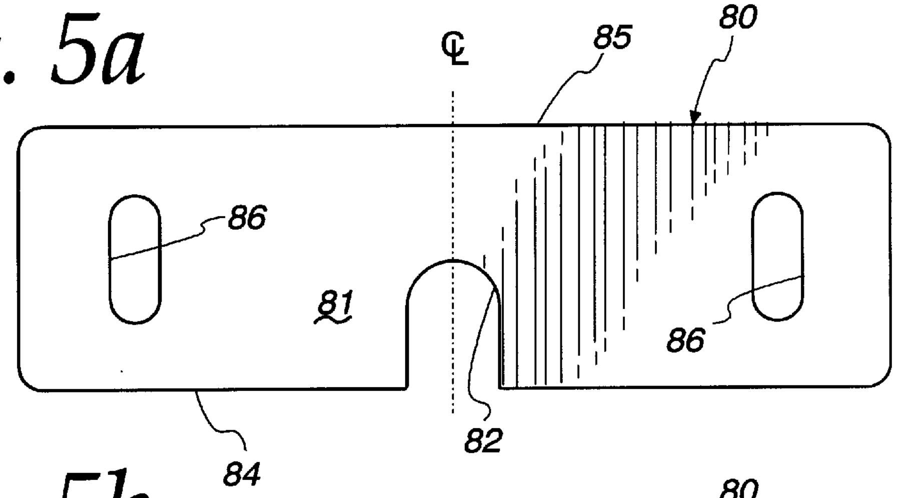
FIG. 5A illustrates a plan view of a retainer according to one embodiment of the present invention.
Figure 5B:
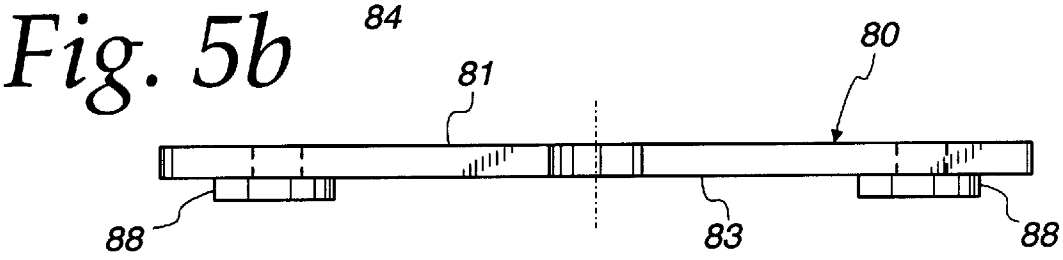
FIG. 5B is a side view of the retainer shown in FIG. 5A.

Referring also to the detail of tab retainer 80 shown in FIGS. 5A and 5B, tab retainers 80 comprise an essentially flat plate or disc having a top surface 81 and an undersurface 83. Tab retainer 80 is attached to surface 51 of the hang strip material guide 40 by an appropriate attachment mechanism, as is described below. In the preferred embodiment, tab retainer 80 has a lateral width somewhat greater than its longitudinal width. The longitudinal width is defined as being along the centerline CL shown in FIGS. 5A and 5B. However, an alternative embodiment, such as that shown in FIG. 1, may have different longitudinal and lateral dimensions. The longitudinal direction, and centerline CL, are defined as being essentially parallel to the direction which the hang strip material advances from the supply 20 toward the edge 14 of base 12.

Tab retainer 80 includes a tab release notch 82 disposed adjacent one longitudinal edge 84 of the tab retainer 80 and has a second, forward longitudinal edge 85 at the opposed end of tab retainer 80. The tab retainer 80 further includes two apertures 86, which preferably extend longitudinally, in parallel to the centerline CL. The apertures 86 should be wide enough to permit a bolt 87 of appropriate diameter to extend through the apertures 86. Tab retainer 80 further includes two spacers 88 (FIG. 5B) which may be integral with the flat plate of the tab retainer 80, or alternatively may be separate elements, such as washers, which are used when the tab retainer 80 is attached to the guide 40. The spacers 88 also have a corresponding aperture of similar width to the aperture 80 of the tab retainer plate, so that the aperture 86 extends through both the tab retainer 80 and through the spacers 88. An alternative embodiment having washers (not shown) will be captive to the bolts 87, so that only the tab retainer 80 need have longitudinal slots for adjustment of the location of the tab retainer 80 relative to the guide 40. As a second alternative, spacers such as metal blocks (not shown) may be welded to the undersurface 83 of the tab retainer 80 or attached by other appropriate means to provide the desired vertical spacing between surfaces 51 and 83.

The spacers 88 provide a pivotal function in the proper operation of the inventive apparatus 10. The vertical height of the spacers 88 (or 88') is especially important since it provides for proper spacing between the surface 51 of the guide 40 and undersurface 83 of the tab retainer 80. The distance, indicated by the arrows S in FIG. 3, is important because the dimension S will govern how far the fingers 34,36 (FIG. 3) are bent back by the tab retainer 80.

The tab retainer 80 is attached to the guide 40 by an attachment means, such as bolts 87 (FIGS. 1–3). The bolts 87 may attach directly to the portions of guide 40, or, as shown, may require wing nuts 89 to be screwed onto bolts 87 attached to guide 40, so as to hold the tab retainer 80 onto the surface 51 of the guide 40.

Referring now to the cross-sectional view of FIG. 3, the advancing hang strip material 26 is advanced in the direction of the arrow B by the clockwise rotation of sprocket wheel 70. As the sprocket 72 protrudes through the web of material 26 and into the cutout 32, it disengages the interdigitated tabs 34, 36 from each other and from the web of hang strip material and pushes up both tabs 34,36 out of the plane of the hang strip material web, as shown. Continued rotation of the sprocket wheel 70 causes further lateral advancement of the hang strip material 26 and the two sets of tabs 34,36 along the channel toward edge 14.

However, the rounded corners 74 of each sprocket 72 act in different ways on each set of tabs 34,36. The tabs 34, as shown in FIG. 3, take a more vertical angle relative to the surface 15 than do the tabs 36. As the sprocket 72 continues to rotate clockwise, it begins to descend toward the surface 15, causing the resilient tab 36 to revert to a position adjacent the hang strip material web which is parallel to the surface 15. As it descends, however, the resilient tab 34 is continually shifted longitudinally by the pressure of the rounded comer 74 on the edge of the cutout 32. As the tab 36 descends toward tab retainer 80, it is met by the top surface 81 of the tab retainer 80. Continuing lateral advancement of the hang strip material 26 causes the engagement of the tab 36 with the tab retainer 80 to be pushed against the forward edge 85, which forces the tab 36 to change shape by bending it back toward the supply 20 against itself. A bent-back tab 36' is shown in FIG. 3 between the surfaces 51 and 83 located somewhat laterally of edge 85. While in the bent back position, the continual lateral advance of the hang strip material 26 transposes the tab 36' along the guide channel in a bent back position.

In the meantime, as the sprocket 72 recedes below the level of surface 15, the other set of tabs 34 revert to the web of the hang strip material 26. The cutout 32, with the bent back tab 36, proceeds to edge 14, where the channel and transition portion 55 from guide 40 cause the direction of travel of the hang strip material to divert at right angles from a horizontal advance direction to a downwardly vertical direction, as shown in FIG. 3. This abrupt, essentially perpendicular change in direction of the hang strip material advance causes the hang strip material 26 to bend at right angles around edge 14 as it advances into the item attachment station.

When the cutout 32 reaches the item attachment station at edge 14, the perpendicular fold in the hang strip material 26 causes the interdigitated tabs 34 to again separate from the web of the hang strip material 26 and to project upwardly from the hang strip material web at the item attachment station. The notch 82 provides sufficient clearance between edge 14 and the tab retainer 80 to permit the tabs 34 to bend away from the hang strip material web and to vertically protrude above edge 14 as the remainder of the hang strip material web 26 begins to bend vertically downwardly at edge 14.

The tab retainer 80 continues to retain the tab 36 in a bent-back position and an unimpeded opportunity becomes available to attach an item 11 onto the essentially vertically protruding tabs 34. Insertion of the item 11 onto tabs 34 must be done in an expeditious manner before the hang strip material advances, preferably before the continuing advance of the hang strip material releases bent-back tab 36 as it clears the retainer release notch 82.

Once the item 11 firmly engages the upwardly extending tabs 34, continuing forward advance of the hang strip material 26 causes the bent-back tab 36 to clear the retainer 80 at the release notch 82. As soon as the tab 36 clears the notch 82 (see tab 36 in FIG. 3), the surface 83 no longer operates to retain the tab 36 in position and the tab 36 tends to revert to its original position within the web of the hang strip material 26 in the direction of arrow R. Of course, because item 11 has been attached to the opposing tabs 34, tab 36 cannot completely revert to its original position. The resilient memory of the tab 36 once again brings the tab 36 into interdigitated relation with the opposing tabs 34, over item 11 which is now held in place by the tabs 34,36. As the hang strip material 26 continues to travel vertically downwardly, attached items 11 are held in place by tabs 32,34 at each cutout 32 of the hang strip.

Other features or modifications may become desirable to an operator of the apparatus 10. For example, a knife or other cutting mechanism may be utilized after attachment of items 11. An appropriate cutting mechanism (not shown) may be automatically or manually operated to cut the hang strip material at appropriate intervals. Cutting of the hang strip material would be necessary to provide manageable loaded hang strips, e.g., having 8–12 items per strip, which can be easily packed into boxes and removed at the point of sale.

Figure 6:
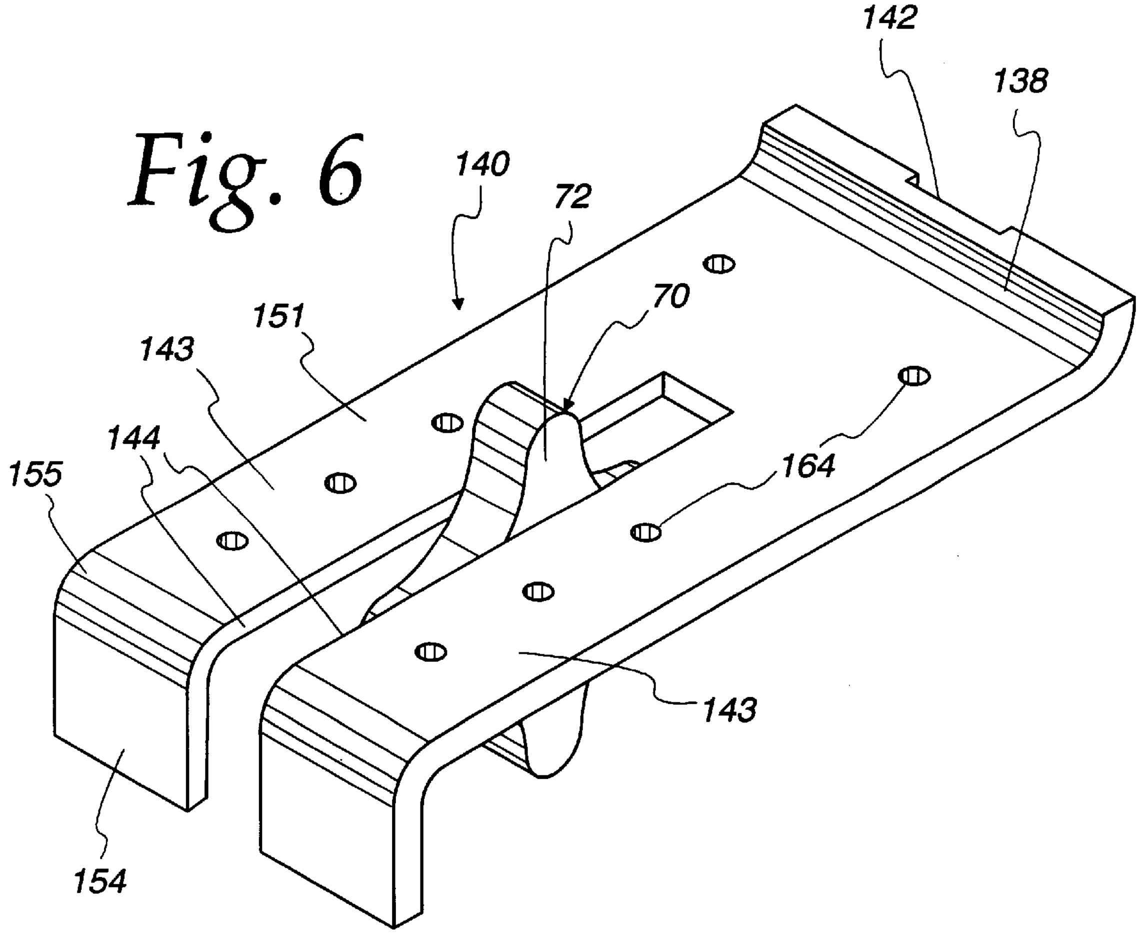
FIG. 6 is a schematic perspective view of an alternative embodiment of the guide of the present invention showing a unitary guide according to the present invention.

The hang strip guide 40 is illustrated in FIGS. 1, 3 and 5A, 5B as comprising two longitudinal pieces being separated by a longitudinally extending channel between them. However, the hang strip guide may alternatively comprise a unitary hang strip guide 140 as shown in FIG. 6.

A unitary guide 140 having a flanged curve 138 includes a channel groove 142 disposed along a longitudinal direction for receiving the hang strip material and for guiding it through the channel groove 142 of the guide 140. FIG. 6 does not show the other elements of the apparatus 10 since these will be essentially identical to those shown in FIGS. 1–3 and 4A–4B. Sprocket wheel 70 is shown to indicate the orientation of the unitary guide 140 relative to the other elements of the alternative apparatus configuration.

The unitary guide 140 further includes two guide extensions 143 and a central passageway between the walls 144 of the two guide extensions 143 which runs parallel to the grooves 42. It is necessary that the lateral width between the two grooves 142 be somewhat larger than the gap between extensions 143. That is, the grooves 142 provide for a step so that walls 144 of guide extensions 143 are cantilevered over the section of the surface 15 that will provide the channel for the hang strip material 26 to be transposed thereover, in accordance with the discussion above.

The gap between guide extensions 143 is not adjustable, as in the preferred embodiment shown in FIGS. 1–4C, but the guide 140 adjacent the item attachment station may be otherwise identical in construction adjacent the item attachment station, including downwardly projecting portions 154 and transition portions 155. An alternative attachment mechanism may comprise threaded holes 164, rather than slots. The unitary structure need not have means to adjust the lateral position of the guide extensions 143, which permits for a single connection location of the guide 140 to the surface 15 of base 12. Similarly, holes 164 may also provide for bolts (not sown) which extend above the surface 151 to provide for attachment of the tab retainer.

Other modifications, substitutions or alternative configurations may become apparent to one having ordinary skill in the art, and such modifications or alterations may provide a configuration which does not greatly depart from the scope of the present invention. For example, a unitary guide and tab retainer, as one integral construction, may be provided having identical or essentially identical height or lateral dimensions, in accordance with the teachings of this invention. It remains up to the general skill of a person in the field to devise a tab retainer guide construction which provides for one set of tabs of a hang strip material to be bent back while permitting the other to project upwardly. Such an arrangement maybe appropriate in an application which provides for a standardized hang strip material having standard dimensions and standard attachment items 11, in which case no adjustments would be necessary for the dimensions of the apparatus. Accordingly, the above description is illustrative only and is not intended to be limiting, the scope of the invention being limited only by the claims below.

What is claimed is:

1. A hang strip loading device for loading attachable items to a hang strip material, the hang strip material having a predetermined thickness, two lateral edges and a plurality of cut portions extending through the thickness of the hang strip material, each cut portion forming interdigitated tabs for releasable attachment of items thereto, each cut portion being spaced from the hang strip lateral edges and from any adjacent cut portions, said device comprising:

a) a base having an upwardly facing surface;

b) a hang strip material supply station for mounting a supply of hang strip material capable of continuously paying out hang strip material;

c) an item attaching station;

d) a hang strip material advance station for continuously advancing said hang strip material from the hang strip material supply station through said item attachment station, said advance station including at least one guide adjacent said base surface and including a channel spaced from the base surface by at least the thickness of the hang strip material, said guide providing a channel shaped and dimensioned to retain the two lateral edges of said hang strip material adjacent said base surface at said hang strip material advance station while exposing an opening directly above the cut portions thereof, said hang strip material advance station further including a cut portion tab lifting mechanism, comprising at least one protrusion member capable of protruding above said base surface, each said protrusion member being shaped and dimensioned to protrude through one cut portion of said hang strip material so as to lift the interdigitated tabs above the surface of said base, said advance station further including an advance driver for translating said protrusion member and said hang strip material through said advance station along an advance direction extending from said supply toward said item attachment station; and e) a tab retainer adjacent said hang strip advance station, spaced from said base surface such that at least one of the interdigitated tabs of each cut portion lifted by said protrusion is retained by said tab retainer in a lifted position while said cut portion is rectilinearly translated along the advance direction, said tab retainer having a tab release portion at said item attaching station releasing the retained tab and thereby permitting the retained tab to close over the item after it has been releasably mounted to at least one of the interdigitated tabs not retained by said tab retainer.

2. The hang strip loading device according to claim 1 wherein said driver comprises a sprocket wheel being rotatable about an axis extending transversely to the direction of advance of the hang strip material, said sprocket wheel having at least one protrusion member being rotatable with said sprocket wheel, said protrusion member being shaped and dimensioned to be insertable into a cut portion of the hang strip material.

3. The hang strip loading device according to claim 2 wherein said driver further includes a motive assembly to rotate said sprocket wheel.

4. The hang strip loading device according to claim 3 wherein said motive assembly further comprises an electric motor associated with said sprocket wheel to provide for rotating the sprocket wheel, said motor including a variable speed adjustment for rotating the motor at a desired rate of speed.

5. The hang strip loading device according to claim 1 wherein said guide comprises two plates extending longitudinally between said hang strip material supply station and said item attachment station, each said plate having a laterally extending channel surface facing downwardly in opposed relation to the base surface, said plates being mounted onto said base surface and providing said hang strip channel, said hang strip channel having a clearance between said laterally extending channel surface and said base surface, the clearance being of sufficient dimension to permit the two lateral edges of the hang strip material to freely pass through each hang strip channel.

6. The hang strip loading device according to claim 5 wherein said driver comprises a sprocket wheel being rotatable about an axis extending transversely to said channel, said sprocket wheel having at least one protrusion member rotatable with said sprocket wheel, said protrusion member being shaped and dimensioned to be insertable into a cut portion of the hang strip material.

7. The hang strip loading device according to claim 6 wherein a majority of said sprocket wheel is disposed below the base surface, said guide plates are mounted on said base surface and are laterally spaced apart to provide lateral clearance between said channel surfaces, wherein said sprocket protrusion member is capable of extending through a cut portion of the hang strip material and then through the lateral clearance to extend above the guide plates.

8. The hang strip loading device according to claim 1 wherein said base includes an edge and said item attaching station is disposed adjacent said edge, and wherein said guide extends longitudinally from said hang strip advance station to said edge in parallel with said base surface, and at said edge, said guide includes downwardly folded guide flanges adjacent said edge to guide the lateral edges of the hang strip material around said base edge and downwardly from said item attachment station, said edge providing for opening the interdigitated tabs not retained by said tab retainer.

9. The hang strip loading device according to claim 8 wherein said guide flanges are further oriented and positioned relative to said base edge so that said guide flanges produce a change in direction in said hang strip material advance so as to guide said hang strip material around said base edge, at least one tab from each cut portion, other than said at least one tab being retained by said retainer, being caused to extend upwardly from the hang strip material, whereby an item having an item attachment aperture may be releasably attached to the tab by inserting the tab through the item attachment aperture, and wherein said tab release portion of said tab retainer further is disposed, oriented and adjusted to release the interdigitated tab retained by said tab retainer to overlay at least a portion of the item attachment aperture.

10. The hang strip loading device according to claim 1 wherein said tab retainer further comprises a flat surface parallel to and spaced from said base, extending from said hang strip advance station toward said item attachment station.

11. The hang strip loading device according to claim 10 wherein said tab retainer release portion comprises a cutout removed from said flat surface immediately adjacent said item attachment station.

12. The hang strip loading device according to claim 11 wherein said tab retainer further comprises a metal plate.

13. The hang strip loading device according to claim 12 wherein said metal plate is integral with the base.

14. The hang strip loading device according to claim 12 wherein said metal plate is separate and is attached to the base by an attachment means so as to permit adjustment of the vertical dimension between the tab retainer and the base surface.

15. The hang strip loading device according to claim 10 wherein said tab retainer further comprises a metal plate.

* * * * *